(12) United States Patent
Lewke et al.

(10) Patent No.: US 9,181,927 B2
(45) Date of Patent: Nov. 10, 2015

(54) LIGHTNING PROTECTION SYSTEM FOR A WIND TURBINE, WIND TURBINE AND METHOD FOR PROTECTING COMPONENTS OF A WIND TURBINE AGAINST LIGHTNING STRIKES

(75) Inventors: Bastian Lewke, Herning (DK); Kaj Olsen, Riiskov (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 783 days.

(21) Appl. No.: 13/451,577

(22) Filed: Apr. 20, 2012

(65) Prior Publication Data

US 2012/0282097 A1 Nov. 8, 2012

(30) Foreign Application Priority Data

May 3, 2011 (EP) .................................... 11164586

(51) Int. Cl.
*F03D 11/00* (2006.01)

(52) U.S. Cl.
CPC ............ *F03D 11/00* (2013.01); *F03D 11/0033* (2013.01); *F05B 2220/7066* (2013.01); *Y02E 10/722* (2013.01); *Y02E 10/725* (2013.01); *Y10T 29/49117* (2015.01)

(58) Field of Classification Search
CPC ..... F03D 11/0033; F03D 11/00; F03D 11/04; Y02E 10/722

USPC ............................................................ 416/39
See application file for complete search history.

(56) References Cited

U.S. PATENT DOCUMENTS

| | | | |
|---|---|---|---|
| 6,457,943 B1 * | 10/2002 | Olsen et al. | 416/230 |
| 7,377,750 B1 | 5/2008 | Costin | |
| 7,431,567 B1 * | 10/2008 | Bevington et al. | 416/244 R |
| 2007/0114797 A1 * | 5/2007 | Krug et al. | 290/44 |
| 2009/0038819 A1 * | 2/2009 | Molbech | 174/2 |
| 2010/0133821 A1 * | 6/2010 | Scholte-Wassink | 290/44 |

FOREIGN PATENT DOCUMENTS

| | | |
|---|---|---|
| DE | 102007052525 A1 | 5/2009 |
| EP | 1036937 A2 | 9/2000 |
| EP | 1568883 A2 | 8/2005 |
| WO | WO 0014405 A1 | 3/2000 |
| WO | WO 0186144 A1 | 11/2001 |
| WO | WO 2007062659 A1 | 6/2007 |

OTHER PUBLICATIONS

DE102007052525 Machine Translation.pdf (Jan. 22, 2015).*

* cited by examiner

*Primary Examiner* — Nathaniel Wiehe
*Assistant Examiner* — Eldon Brockman

(57) ABSTRACT

A lightning protection system for a wind turbine includes at least one insulated high-voltage cable, a pick-up unit and an additional insulated high-voltage cable. The at least one insulated high-voltage cable is electrically connected to a lightning receptor and to the pick-up unit. The pick-up unit is electrically connectable to an electrically grounded member by the additional insulated high-voltage cable.

12 Claims, 3 Drawing Sheets

LIGHTNING PROTECTION SYSTEM FOR A WIND TURBINE, WIND TURBINE AND METHOD FOR PROTECTING COMPONENTS OF A WIND TURBINE AGAINST LIGHTNING STRIKES

CROSS REFERENCE TO RELATED APPLICATIONS

This application claims priority of European Patent Office Application No. 11164586.7 EP filed May 3, 2011. All of the applications are incorporated by reference herein in their entirety.

FIELD OF INVENTION

A lightning protection system for a wind turbine is provided. Further, a wind turbine and a method for protecting components, for example electrical components, of a wind turbine against lightning strikes are provided.

BACKGROUND OF INVENTION

When a lightning strikes a wind turbine, the lightning often hits an area of one or more of the blades from where the current from the lightning strike is conducted inside or outside the blade by conducting means, like a down conductor, to one or more wind turbine components like the hub, the nacelle and the tower and further down to the ground. The aim is though to ensure that the current from the lightning strike on its way through the wind turbine does not reach any electrical components like the generator or converter or other critical components like the main bearings or gearbox that would be damaged by the large energy of the lightning strike.

The combination of a high voltage, large electrical current and strong resulting electromagnetic fields from the lightning strike could damage the generator or other electrical components of the wind turbine. Having a direct drive wind turbine, also called a gearless wind turbine, makes it is more difficult to conduct the lightning strike from one or more of the blades through the wind turbine without damaging especially the generator as it is connected directly to the blade hub of the wind turbine. Having a direct drive wind turbine with a generator with an outer rotating rotor makes it even more difficult to find a way to conduct the electrical current from the lightning strike on the blades of the wind turbine to the ground without damaging the generator.

In state of the art design of a wind turbine, the lightning strike is conducted by the down conductor of the blades directly to the hub which will further conduct the current from the lightning strike to the nacelle and further down to the ground. This kind of lightning protection system does not work for a direct drive wind turbine where the generator is connected directly to the hub as the generator then might be damaged by a lightning strike.

U.S. Pat. No. 7,377,750 B1 shows a lightning protection system for conducting lightning strikes to the blades and further to the region surrounding a blade hub and along a path around the blade hub and critical components of the wind turbine. The lightning conducting path around a hub is quite long with one or more directional shifts or turns and every place where this path has a directional shift or turn there is a substantial risk that the electrical current from the lightning strike jumps from the lightning conducting path to a component close to the lightning conducting path, like e.g. the blade hub and then further to the generator.

SUMMARY OF INVENTION

An improved lightning protection system for a wind turbine is provided. Further, a wind turbine, which overcomes the previously mentioned difficulties and reduces the mentioned risks, is provided. Also, a method for protecting components of a wind turbine against lightning strikes is provided, which reduces the risk that electrical current from a lightning strike jumps from the lightning conducting path to a component close to the lightning conducting path and then further to the generator.

The lightning protection system for a wind turbine comprises at least one insulated high-voltage cable. Moreover, the lightning protection system comprises a pick-up unit and an additional insulated high-voltage cable. The at least one insulated high-voltage cable is electrically connected to a lightning receptor, for example at its first end. Moreover, the at least one insulated high-voltage cable is electrically connected to the pick-up unit, for example at its second end. The pick-up unit is further electrically connectable to an electrically grounded member by means of the additional insulated high-voltage cable.

The use of insulated high-voltage cables has the advantage, that the current from a lightning strike on a component of a wind turbine, for example on a wind turbine blade, may be conducted from the component to an electrically grounded member, for example a tower of the wind turbine, without reaching the sensitive electrical components like the stator windings and the permanent magnets of the rotor and also avoiding critical parts like the main bearings.

Standard electrical isolated high-voltage cables (also abbreviated as HV cable) for lightning protection may be used as the HV cable and may be driven in a simple way without several directional shifts or turns between, for example, the rotor blade and the attachment area on the inner shaft of the wind turbine.

Moreover, the use of a pick-up unit has the advantage, that only one additional insulated HV cable is necessary to conduct the current from a lightning strike to an electrically grounded member, like the wind turbine tower. In this case only one HV cable passes the critical electrical components of the wind turbine like the generator or converter or other critical components like the main bearings or gearbox that could be damaged by the large energy of the lightning strike.

Preferably, a shielding device, for example a shielding hose or a shielding tube, is fitted around the at least one HV cable or around the additional HV cable. Alternatively, a shielding device or a shielding means, for example a shielding hose or a shielding tube, may be implemented directly in the at least one HV cable or in the additional HV cable. The shielding device may be made of metallic material. Furthermore, the shielding device may be fitted and/or may be carried by specific brackets. The use of additional shielding hoses or tubes, for example metallic shielding hoses or tubes, which may be installed around the HV cables, reduces the electromagnetic fields around the HV cables.

For example, the at least one HV cable and/or the additional HV cable may be electrically connected to the pick-up unit by means of a slip ring and/or a contact brush and/or a spark gap.

The wind turbine comprises a lightning protection system as previously described. Generally, the wind turbine has the same advantages as the previously described lightning protection system.

The wind turbine may comprise a rotation axis. Preferably, the pick-up unit can be placed at the rotation axis. Moreover, the wind turbine may comprise a central unit. The central unit can be located at the rotation axis. In this case, the pick-up unit may advantageously be located at the central unit. The wind turbine can comprise a hub. The hub may comprise a central hub unit. The pick-up unit can be located at the central hub unit. The wind turbine can further comprise a main shaft. The main shaft may comprise a central main shaft unit. In this case, the pick-up unit can preferably be located at the central main shaft unit.

A central location of the pick-up unit, for example, at the central hub unit or at the central main shaft unit, makes it possible to connect the pick-up unit to the electrically grounded member, which may for example be the wind turbine tower, in a simple way without several directional shifts or turns and without reaching the sensitive critical components like the stator windings and the permanent magnets of the rotor. Furthermore, critical parts like the main bearings can effectively be avoided by connecting only one centrally located pick-up unit to the grounded member by, for example, only one additional HV cable.

The central hub unit or the central main shaft unit can comprise at least one electric slip ring or a number of electric slip rings and/or a hydraulic union.

The wind turbine may comprise at least one rotor blade. The rotor blade may comprise a lightning receptor. The lightning receptor can be connected to the at least one HV cable. For example, the lightning receptor can be connected to the at least one HV cable by means of a blade down conductor. The blade down conductor can preferably be located inside the blade. The down conductor of the blade can advantageously be connected a first end of an electrical isolated HV cable inside the blade. The second end of the HV cable can be attached to the pick-up unit or pick-up structure which is located at the central hub unit or the central main shaft unit.

The wind turbine may comprise a wind turbine tower. It may additionally comprise a transition piece which is located between the tower and a nacelle of the wind turbine. A further electrical connection between the central hub unit and/or the central main shaft unit to the tower or to the transition piece can be achieved by the additional HV cable. The additional HV cable can advantageously be additionally shielded and isolated. This will allow for extremely low electromagnetic field conditions in the nacelle.

The pick-up unit or pick-up structure is electrically isolated, for example by an isolating carrying structure. It may be isolated from the central hub unit and/or the hub and/or the main shaft and/or the central main shaft unit. An electrical isolation of the pick-up unit or pick-up structure provides an effective protection of the sensitive electrical components and critical parts like the main bearings from being damaged by lightning strikes.

Moreover, the wind turbine may comprise an electrically grounded member. It may further comprise at least one lightning conductor which is electrically connected to the electrically grounded member by means of an insulated high voltage cable. The electrically grounded member may be, for example, the wind turbine tower or a transition piece which is located between the tower and the nacelle. The at least one lightning conductor, may, for example, be a Franklin rod. The lightning conductor or Franklin rod can be located at the nacelle. The connection of a lightning conductor to the grounded member by means of an insulated HV cable reduces the electromagnetic field caused by a lightning strike in the nacelle and at the same time protects the sensitive electrical components and sensitive mechanical components of the wind turbine against lightning strikes.

Generally, the wind turbine may be a direct drive wind turbine. Furthermore, the wind turbine may comprise a generator with an outer rotor system or a generator with an inner rotor system. The previously described lightning protection system can be applied for outer rotor generators and inner rotor generators in the same way.

The method for protecting components, especially electrical components, of a wind turbine against lightning strikes is related to a wind turbine which comprises an electrically grounded member and at least one lightning receptor. The method is characterised in electrically connecting the at least one lightning receptor to a pick-up unit by means of a HV cable and electrically connecting the pick-up unit to the electrically grounded member by means of an additional HV cable. Generally, the HV cable for connecting the at least one lightning receptor to the pick-up unit can have the same properties as the HV cable for connecting the pick-up unit to the electrically grounded member.

The method has the same advantages as the previously described lightning protection system and the wind turbine.

In the context of the present disclosure, the word "additional" is only used to distinguish the two mentioned HV cables from each other.

Further features, properties and advantages will become clear from the following description of an embodiment in conjunction with the accompanying drawings. All mentioned features are advantageous separate or in any combination with each other.

BRIEF DESCRIPTION OF THE DRAWINGS

An embodiment will now be described with reference to FIGS. 1 to 5.

DETAILED DESCRIPTION OF INVENTION

Figure 1:
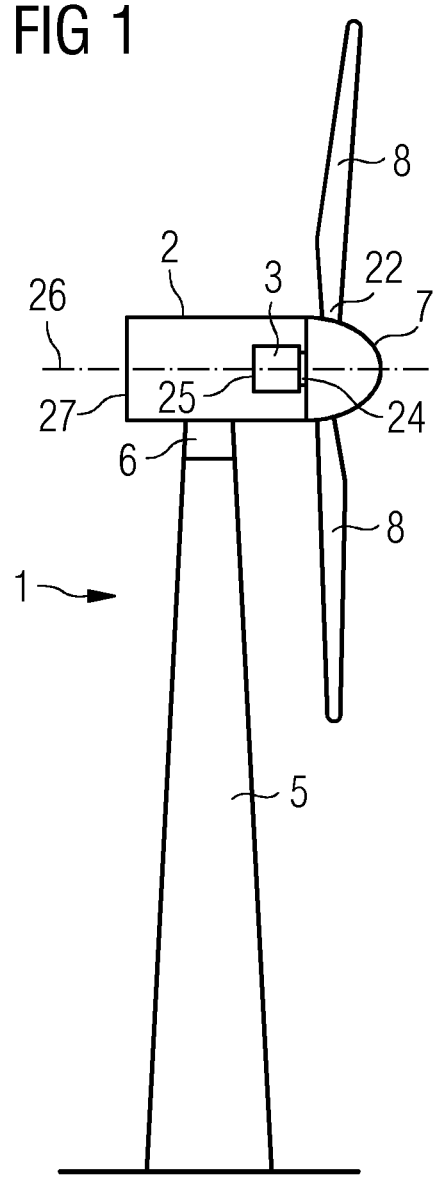
FIG. 1 schematically shows a wind turbine.

FIG. 1 schematically shows a wind turbine 1. The wind turbine 1 comprises a tower 5, a nacelle 2 and a hub 7. The nacelle 2 is located on top of the tower 5. A transition piece 6 is located between the tower 5 and the nacelle 2. The hub 7 comprises a number of wind turbine blades 8. The hub 7 is mounted to the nacelle 2. Moreover, the hub 7 is pivot-mounted such that it is able to rotate about a rotation axis 26. The nacelle 2 comprises a far side 27, which is located opposite to the hub 7.

A generator 3 is located inside the nacelle 2. The generator 3 comprises a near side 24 facing the hub 7 and a far side 25 opposite to the hub 7. Generally, the generator 3 may have an outer rotor configuration or an inner rotor configuration. The wind turbine 1 is a direct drive wind turbine.

Figure 2:
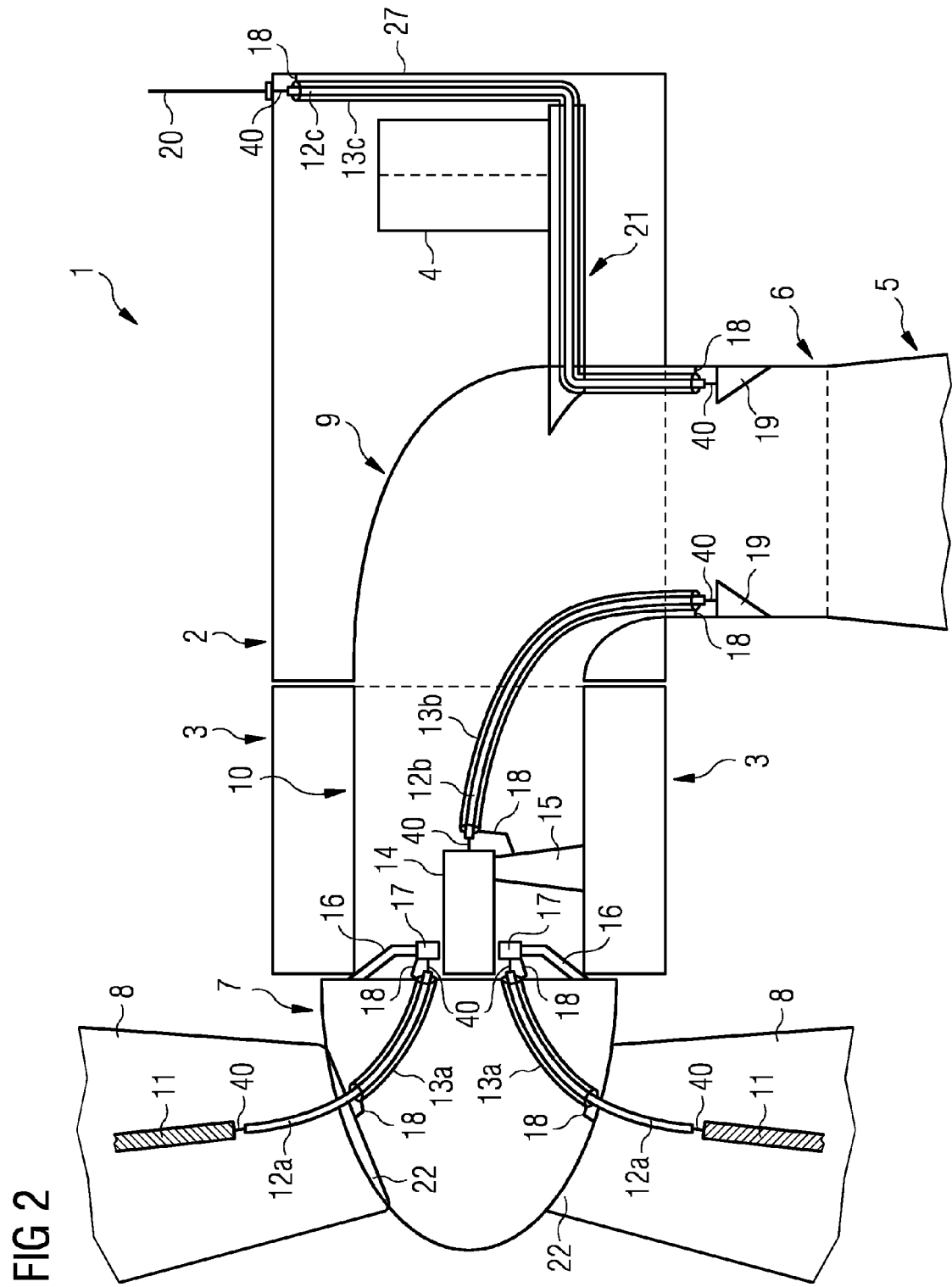
FIG. 2 schematically shows part of a wind turbine.

FIG. 2 schematically shows part of the wind turbine 1. The wind turbine 1 comprises a direct-drive generator 3 which is located between the nacelle 2 and the hub 7. Alternatively, the direct-drive generator 3 can be located inside the nacelle 2. The wind turbine 1 comprises a lightning protection system which comprises one or more electrical isolated high-voltage cables 12 (HV cables). A shielding device, for example a shielding hose or tube 13, is fitted around the HV cables 12 or can be implemented directly in the HV cables 12.

The rotor blades 8 each comprise at least one lightning receptor, which is not shown in FIG. 2. The lightning receptor is connected to a blade down conductor 11 that guides the lightning current towards the blade root 22. The blade root 22 is the portion of the blade 8 where the blade 8 is connected to the hub 7. The blade down conductor 11 is preferably placed inside the blade 8.

The blade down conductor 11 is connected to the HV cable 12a. In FIG. 2, the connection between the blade down conductor 11 and the HV cable 12a is located inside the rotor blade 8 close to the blade root 22. Alternatively, the connection between the blade down conductor 11 and the HV cable 12a can be located inside the hub 7. In other words, the first end of the HV cable 12a is connected to the blade down conductor 11. The second end of the HV cable 12a is connected to the pick-up unit 14 or pick-up structure 14.

The internal structure of the wind turbine 1 consist among other things of a bed frame 9, a main shaft 10, a main support structure 21 and an electrical system in cubicles 4. These components can preferably be located inside the nacelle 2. The wind turbine nacelle 2 is mounted via the transition piece 6 that comprises also the yaw section onto the wind turbine tower 5.

Preferably, the pick-up unit 14 is located at the rotation axis 26. The wind turbine 1 may comprise a central main shaft unit or a central hub unit. In this case, the pick-up unit 14 can be located at the central main shaft unit or the central hub unit. The central hub unit can consist of electric slip rings and the hydraulic union.

The pick-up unit or pick-up structure 14 is electrically isolated from the central hub unit and/or the central main shaft unit and the hub 7 or main shaft 10 by an isolating carrying structure 15. Generally, the central hub unit with the pick up structure 14 or the pick-up unit 14 can be either placed inside the main shaft 10 or inside the hub 7. Dependent on its placement, different parts of this unit and therefore also of the attached lightning protection systems will be static, respectively rotating.

The tower 5 and/or the transition piece 6 form an electrically grounded member or comprise an electrically grounded member. The pick-up unit or pick-up structure 14 is electrically connected to the electrically grounded member by means of an additional insulated HV cable 12b. This additional HV cable 12b distributes the lightning current further towards the electrically grounded member, for example the transition piece 6. The additional HV cable 12b comprises a shielding device 13b. The shielding device 13b may have the same properties as the in the context of the other HV cables 12 previously described metallic hoses or tubes 13.

The shielding hoses 13a are connected at its first end to the hub 7 by means of brackets 18. They are connected at its second ends to the hub or to the pick-up unit 14 or to a central hub unit or a central main shaft unit by means of specific brackets 18. The shielding hose 13b is connected to the isolating carrying structure 15 by means a specific bracket 18. It is connected with its second end to specific protrusions 19 of the transition piece 6 by means of brackets 18.

The first end of the additional HV cable 12b is connected to the pick-up unit 14. The second end of the additional HV cable 12b is, for example, electrically connected to the transition piece 6 or to the tower 5 or to another electrically grounded member. In FIG. 2 the second end of the additional HV cable 12b is mounted inside the transition piece 6 by a metallic bracket 19.

Generally, the connection between the HV cables 12 and the pick-up unit 14 can be realised by slip rings and/or brushes, for example carbon brushes or contact brushes, and/or spark gaps. These connecting means, for example the slip rings, brushes or spark gabs, are preferably located in the centre of the main shaft 10. In FIG. 2 the high voltage cables 12a are connected to the pick-up unit 14 by means contact brushes 17. The contact brushes 17 are connected to the hub 17 by means of isolated carrying means 16.

Moreover, in FIG. 2 the nacelle 2 comprises a Franklin rod 20. The Franklin rod 20 is located on top of the nacelle 2 and at the far side 27 of the nacelle 2. The Franklin rod or a number of Franklin rods 20 on the nacelle 2 additionally provides the outer lightning protection of the wind turbine 1. In order to safely guide the lightning current to ground, a first end of an HV cable 12c is connected to the Franklin rods 20. The second end of this HV cable 12c is connected to an electrically grounded member of the wind turbine 1. This HV cable 12c has the same properties and advantages as the previously described HV cables 12a and 12b. For example, it can be mounted inside the transition piece 6 by a metallic bracket 19.

In order to limit the electromagnetic fields around the HV cable 12c, additional metallic hoses or tubes 13c are installed around this cable 12c. The first end of the shielding hose 13c is connected to the nacelle by a specific bracket 18. The second end of this shielding hose 13c is connected to specific protrusions 19 of the transition piece 6 also by means of a specific bracket 18.

Figure 3:
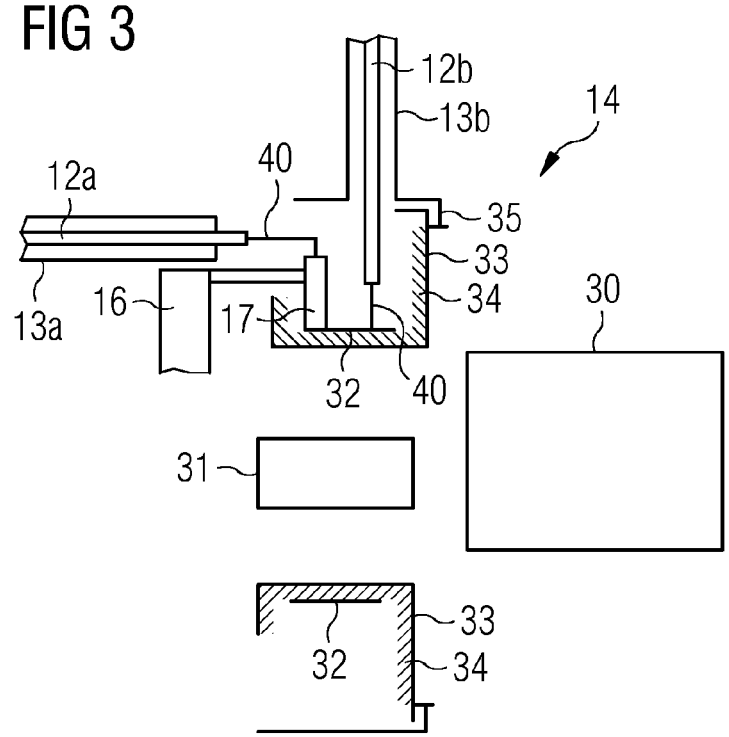
FIG. 3 schematically shows part of a pick-up structure.

FIG. 3 schematically shows part of a pick-up structure 14 or pick-up unit 14 in detail. The pick-up unit 14 is connected to a central unit 30 or is located closed to a central unit 30. The pick-up unit 14 comprises a slip ring 31 and a steel ring 32. The steel ring 32 is isolated by means of a shielding cage 33 with an insulation layer 34. The shielding cage 33 with the insulation layer 34 allows for extremely low electromagnetic field conditions in the nacelle 2.

Generally, the shielding hoses 13 can be steel hoses. Also the shielding cage 33 can be made of steel or can comprise steel. The insulation layer 34 may for example comprise a glass fibre reinforced polymer (GFRP).

The high voltage cables 12a which are connected with its first end to blade down conductors 11 are connected with its second end to the steel ring 32 by means of contact brushes 17. The contact brushes 17 are connected to the hub 7 by means of isolating carrying means 16. Instead of using contact brushes 17, the electrically conducting connection between the high voltage cable 12a and the steel ring 32 can be realized by spark gaps. Reference numeral 40 indicates electrical connections.

The additional HV cable 12b is electrically conducting connected to the steel ring 32. In FIG. 3 the shielding hose 13b of the additional HV cable 12b is connected to the shielding cage 33 by means of a bolt connection 35.

Alternatively to the embodiment shown in FIG. 3, the steel ring 32 can rotate with the hub 7 and can be connected to the additional HV cable by means of a contact brush. In this case, in FIG. 3 the high voltage cable 12a can be regarded as the additional HV cable and the HV cable 12b can be regarded as the HV cable being connected to a blade down conductor.

Figure 4:
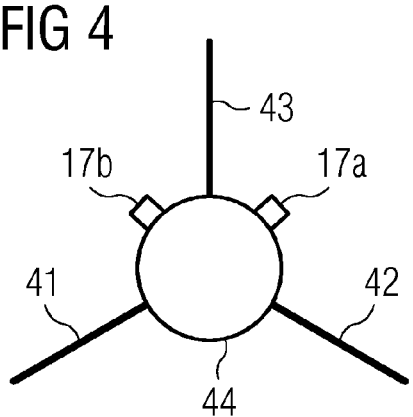
FIG. 4 schematically shows an example for connecting the second ends of the high voltage cables with each other and with contact brushes.

FIG. 4 schematically shows an example for connecting the second ends of the high voltage cables with each other and with the contact brushes. A first high voltage cable 41 is connected to one or more lightning receptors of a first blade 8. A second high voltage cable 42 is connected to one or more lightning receptors of a second blade 8. A third high voltage cable 43 is connected to one or more lightning receptors of a third blade 8. The three HV cables 41, 42 and 43 are each connected to a ring shaped HV cable 44.

The ring shaped HV cable 44 comprises two contact brushes 17a and 17b. In FIG. 4 the first contact brush 17a is located between the connection of the second HV cable 42 with the ring shaped HV cable 44 and the connection between the third HV cable 43 and the ring shaped HV cable 44. The second contact brush 17b is located between the connection of the third HV cable 43 with the ring shaped HV cable 44 and the connection of the first HV cable 41 and the ring shaped HV cable 44. The HV cables 41, 42, 43 and 44 can be connected to the steel ring 32 by means of the contact brushes 17a and 17b.

Figure 5:
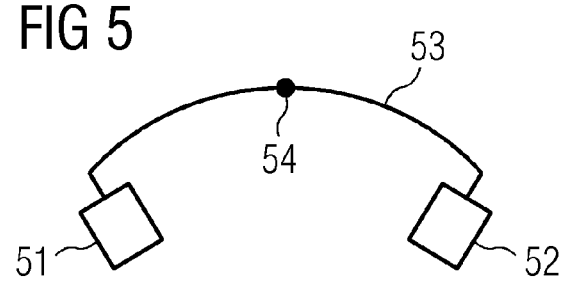
FIG. 5 schematically shows an electrical connection between two slip rings.

FIG. 5 schematically shows an electrical connection between two slip rings 51 and 52. The slip ring connection 53 connects a first slip ring 51 with a second slipping 52. The slip ring connection 53 comprises a high voltage cable connection 54.

It is further noted that within this document the term "connecting" or "connected" means electrically connected, if not mentioned otherwise. Thereby, the electrical connection may be established directly between the respective components or indirectly via one or more other components being electrically conductive.

The invention claimed is:

1. A wind turbine comprising:
   a rotation axis; and
   lightning protection system comprising:
      a first insulated high-voltage cable,
      a second insulated high-voltage cable,
      a pick-up circuitry positioned at the rotation axis comprising a ring that is electrically isolated via a shielding cage with an insulation layer,
      wherein the first insulated high-voltage cable is electrically connected to a lightning receptor and is electrically coupled to the ring of the pick-up circuitry via at least one of a brush, a spark gap or combination thereof, wherein the shielding cage partially surrounds portions of the ring and the at least one of the brush, the spark gap, or combination thereof, wherein a portion of the shielding cage extends between the ring and the rotational axis, and
      wherein the ring of the pick-up circuitry is electrically connectable to an electrically grounded member via the second insulated high-voltage cable.

2. The wind turbine as claimed in claim 1, wherein a shielding device is fitted around the second high-voltage cable, wherein the shielding device is connected to the shielding cage.

3. The wind turbine as claimed in claim 1, further comprising:
   a central unit located at the rotation axis, wherein the pick-up unit is located at the central unit.

4. The wind turbine as claimed in claim 1, further comprising:
   a hub with a central hub unit that rotates about the rotation axis, wherein the pick-up circuitry is located at the central hub unit.

5. The wind turbine as claimed in claim 1, further comprising:
   a main shaft with a central main shaft unit that rotates about the rotation axis, wherein the pick-up circuitry is located inside the central main shaft unit.

6. The wind turbine as claimed in claim 4, wherein the central hub unit comprises at least one electric slip ring and/or a hydraulic union.

7. The wind turbine as claimed in claim 5, wherein the central main shaft unit comprises at least one electric slip ring and/or a hydraulic union.

8. The wind turbine as claimed in claim 1, further comprising:
   at least one rotor blade with the lightning receptor connected to the first insulated high-voltage cable.

9. The wind turbine as claimed in claim 1 further comprising:
   a hub and/or a main shaft and/or a central hub unit and/or a central main shaft unit, wherein the pick-up circuitry is electrically isolated from the hub and/or the main shaft and/or the central hub unit and/or the central main shaft unit.

10. The wind turbine as claimed in claim 1, further comprising:
    the electrically grounded member and the lightning receptor.

11. The wind turbine as claimed in claim 1, wherein the wind turbine is a direct drive wind turbine.

12. A method for protecting components of a wind turbine against lightning strikes, wherein the wind turbine comprises a rotation axis, an electrically grounded member and at least one lightning receptor, the method comprising:
    electrically connecting the at least one lightning receptor to a ring of a pick-up circuitry positioned at the rotation axis, by a high-voltage cable electrically coupled to the ring via at least one of a brush, a spark gap or combination thereof; and electrically connecting the ring of the pick-up circuitry to the electrically grounded member by an additional high-voltage cable, wherein the ring is electrically isolated via a shielding cage with an insulation layer, wherein the shielding cage partially surrounds portions of the ring and the at least one of the brush, the spark gap, or combination thereof, wherein a portion of the shielding cage extends between the ring and the rotational axis.

* * * * *